United States Patent
LaConti et al.

(10) Patent No.: US 6,500,319 B2
(45) Date of Patent: Dec. 31, 2002

(54) PROTON EXCHANGE MEMBRANE (PEM) ELECTROCHEMICAL CELL HAVING AN INTEGRAL, ELECTRICALLY-CONDUCTIVE, COMPRESSION PAD

(75) Inventors: Anthony B. LaConti, Lynnfield, MA (US); William A. Titterington, River Ranch, FL (US); Larry L. Swette, Newton, MA (US); Ricardo Leon, Braintree, MA (US)

(73) Assignee: Giner Electrochemical Systems, LLC, Newton, MA (US)

( * ) Notice: Subject to any disclaimer, the term of this patent is extended or adjusted under 35 U.S.C. 154(b) by 6 days.

(21) Appl. No.: 09/827,368

(22) Filed: Apr. 5, 2001

(65) Prior Publication Data

US 2002/0144898 A1 Oct. 10, 2002

(51) Int. Cl.[7] .................................................. C25B 9/00
(52) U.S. Cl. ....................... 204/263; 204/252; 204/253; 204/266; 429/32; 429/34; 429/35; 429/38
(58) Field of Search ................................ 204/263, 252, 204/253, 266; 429/32, 34, 35, 38

(56) References Cited

U.S. PATENT DOCUMENTS

| | | | |
|---|---|---|---|
| 5,009,968 A | 4/1991 | Guthrie et al. ................ 429/26 |
| 5,316,644 A | 5/1994 | Titterington et al. ........ 204/284 |
| 5,324,565 A | 6/1994 | Leonida et al. ............. 428/131 |
| 5,350,496 A | 9/1994 | Smith et al. ................ 204/263 |
| 5,366,823 A | 11/1994 | Leonida et al. .............. 428/34 |
| 5,466,354 A | 11/1995 | Leonida et al. ............. 204/252 |
| 5,580,672 A | * 12/1996 | Zagaja, III et al. ........... 429/34 |
| 5,798,187 A | * 8/1998 | Wilson et al. ................ 429/34 |
| 6,057,053 A | 5/2000 | Gibb ............................ 429/37 |
| 6,093,502 A | * 7/2000 | Carlstrom, Jr. et al. ....... 429/25 |
| 6,171,719 B1 | * 1/2001 | Roy et al. ..................... 429/34 |
| 6,207,310 B1 | * 3/2001 | Wilson et al. ................ 429/34 |
| 6,358,642 B1 | * 3/2002 | Griffith et al. ................ 429/34 |
| 6,368,592 B1 | * 4/2002 | Colton et al. .............. 424/93.7 |

OTHER PUBLICATIONS

Coker et al., 'Industrial and Government Applications of SPE Fuel Cell and Electrolyzers,' presented at The Case Western Symposium on 'Membranes and Ionic and Electronic Conducting Polymer,' May 17–19, 1982, Cleveland, Ohio.

* cited by examiner

Primary Examiner—Bruce F. Bell
(74) Attorney, Agent, or Firm—Kriegsman & Kriegsman

(57) ABSTRACT

Electrochemical cell comprises, in one embodiment, a proton exchange membrane (PEM), an anode positioned along one face of the PEM, and a cathode positioned along the other face of the PEM. To enhance electrolysis, platinum catalysts are present between the anode and the PEM and between the cathode and the PEM. A multi-layer metal screen for defining a first fluid cavity is placed in contact with the outer face of the anode, and an electrically-conductive, spring-like, porous pad for defining a second fluid cavity is placed in contact with the outer face of the cathode. The porous pad comprises a mat of carbon fibers having a density of about 0.2–0.55 $g/cm^3$. Cell frames are placed in peripheral contact with the metal screen and the compression pad for peripherally containing fluids present therewithin. Electrically-conductive separators are placed in contact with the metal screen and the compression pad for axially containing fluids present therewithin. A plurality of the cells may be arranged in series in a bipolar configuration, without requiring a separate compression pad between cells (for differential pressures up to about 400 psi).

26 Claims, 8 Drawing Sheets

PROTON EXCHANGE MEMBRANE (PEM) ELECTROCHEMICAL CELL HAVING AN INTEGRAL, ELECTRICALLY-CONDUCTIVE, COMPRESSION PAD

BACKGROUND OF THE INVENTION

The present invention relates generally to proton exchange membrane (PEM) electrochemical cells and relates more particularly to a novel PEM electrochemical cell and to a novel PEM electrochemical cell stack.

In certain controlled environments, such as those found in airplanes, submarines and spacecrafts, it is often necessary for oxygen to be furnished in order to provide a habitable environment. An electrolysis cell, which uses electricity to convert water to hydrogen and oxygen, represents one type of device capable of producing quantities of oxygen. One common type of electrolysis cell comprises a proton exchange membrane, an anode positioned along one face of the proton exchange membrane, and a cathode positioned along the other face of the proton exchange membrane. To enhance electrolysis, a catalyst, such as platinum, is typically present both at the interface between the anode and the proton exchange membrane and at the interface between the cathode and the proton exchange membrane. The above-described combination of a proton exchange membrane, an anode, a cathode and associated catalysts is commonly referred to in the art as a membrane electrode assembly.

In use, water is delivered to the anode and an electric potential is applied across the two electrodes, thereby causing the electrolyzed water molecules to be converted into protons, electrons and oxygen atoms. The protons migrate through the proton exchange membrane and are reduced at the cathode to form molecular hydrogen. The oxygen atoms do not traverse the proton exchange membrane and, instead, form molecular oxygen at the anode. (An electrolysis cell, when operated in reverse to generate water and electricity using molecular hydrogen and molecular oxygen as starting materials, is referred to in the art as a fuel cell. Electrolysis cells and fuel cells both constitute electrochemical cells, and all discussion herein pertaining to electrolysis cells is correspondingly applicable to fuel cells.)

Often, a number of electrolysis cells are assembled together in order to meet hydrogen or oxygen production requirements. One common type of assembly is a stack comprising a plurality of stacked electrolysis cells that are electrically connected in series in a bipolar configuration. In a typical stack, each cell includes, in addition to a membrane electrode assembly of the type described above, a pair of multi-layer metal screens, one of said screens being in contact with the outer face of the anode and the other of said screens being in contact with the outer face of the cathode. The screens are used to form the fluid cavities within a cell for the water, hydrogen and oxygen. Each cell additionally includes a pair of polysulfone cell frames, each cell frame peripherally surrounding a screen. The frames are used to peripherally contain the fluids and to conduct the fluids into and out of the screen cavities. Each cell further includes a pair of metal foil separators, one of said separators being positioned against the outer face of the anode screen and the other of said separators being positioned against the outer face of the cathode screen. The separators serve to axially contain the fluids on the active areas of the cell assembly. In addition, the separators and screens together serve to conduct electricity from the anode of one cell to the cathode of its adjacent cell. Plastic gaskets seal the outer faces of the cell frames to the metal separators, the inner faces of the cell frames being sealed to the proton exchange membrane. The cells of the stack are typically compressed between a spring-loaded rigid top end plate and a bottom base plate.

In another typical electrolysis cell stack design, the multi-layer metal screen on the anode side is omitted, and the separator is provided with a set of molded or machined grooves for defining a fluid cavity.

Patents and publications relating to electrolysis cell stacks include the following, all of which are incorporated herein by reference: U.S. Pat. No. 6,057,053, inventor Gibb, issued May 2, 2000; U.S. Pat. No. 5,350,496, inventors Smith et al., issued Sep. 27, 1994; U.S. Pat. No. 5,316,644, inventors Titterington et al., issued May 31, 1994; U.S. Pat. No. 5,009,968, inventors Guthrie et al., issued Apr. 23, 1991; and Coker et al., "Industrial and Government Applications of SPE Fuel Cell and Electrolyzers," presented at The Case Western Symposium on "Membranes and Ionic and Electronic Conducting Polymer," May 17–19, 1982 (Cleveland, Ohio).

In order to ensure optimal conversion of water to hydrogen and oxygen by each electrolysis cell in a stack, there must be uniform current distribution across the active areas of the electrodes of each cell. Such uniform current distribution requires uniform contact pressure over the active areas of the electrodes. However, uniform contact pressure over the active areas is seldom attained solely through design since the dimensions of the various components of a cell typically vary within some specified limits due to the production methods used in their fabrication. In fact, standard electrolysis cells often show compounded component dimensional variations of about 0.007 to about 0.010 inch due to fabrication limitations, with additional dimensional variations of up to about 0.002 inch due to differential thermal expansion during electrolysis cell operation.

One approach to the aforementioned problem of maintaining uniform contact pressure over the entire active areas of the electrodes has been to provide an electrically-conductive compression pad between adjacent cells in a stack. One type of electrically-conductive compression pad that has received widespread use in the art comprises an elastic disk, said disk being provided with an array of transverse holes and transverse slots. The transverse holes are provided in the disk to allow for lateral expansion during compression of the disk. The transverse slots are provided in the disk so that a plurality of parallel metal strips may be woven from one face of the disk to the opposite face of the disk through the slots.

Other types of electrically-conductive compression pads are disclosed in the following patents, all of which are incorporated herein by reference: U.S. Pat. No. 5,466,354, inventors Leonida et al., issued Nov. 14, 1995; U.S. Pat. No. 5,366,823, inventors Leonida et al., issued Nov. 22, 1994; and U.S. Pat. No. 5,324,565, inventors Leonida et al., issued Jun. 28, 1994.

Compression pads of the type described above comprising an elastic disk having parallel metal strips woven therethroughout are generally capable of compensating for dimensional variations of a cell to maintain uniform contact over the active areas of the cell up to pressures of about 500 psi. However, for many military and commercial applications, the present inventors have noted that it is also important that a cell stack be lightweight and inexpensive. As can readily be appreciated, the above-described compression pad, which is physically separate from the individual cells of a stack, adds weight and expense to the stack and is, therefore, not optimal for such applications. Other components of conventional cells, such as the metal screens, also add weight and expense to the stack.

SUMMARY OF THE INVENTION

It is an object of the present invention to provide a novel PEM electrochemical cell.

It is another object of the present invention to provide a PEM electrochemical cell that overcomes at least some of the shortcomings discussed above in connection with existing PEM electrochemical cells.

It is still another object of the present invention to provide a novel PEM electrochemical cell stack.

According to one aspect of the invention, the multi-layer metal screen of a conventional PEM electrochemical cell that is placed in contact with the outer face of the cathode is replaced with an electrically-conductive, spring-like, porous pad. Preferably, said pad is a mat of carbon fibers having a density of about 0.2–0.55 $g/cm^3$, more preferably 0.44–0.55 $g/cm^3$.

Because the pad of the present invention is spring-like (i.e., compressible), a plurality of pad-containing cells can be arranged in a stack, without requiring that a separate compression pad be interposed between adjacent cells for the purpose of maintaining uniform pressure over the active areas of the electrodes, provided that the differential pressure within the stack does not exceed about 400 psi.

In addition, because said pad does not typically experience the same problem of fretting corrosion experienced by a conventional multi-layer screen, a separator plate of the type conventionally used to prevent fretting corrosion of the multi-layer screen may also be omitted from the cell, thereby reducing the cost and weight of the cell.

According to another aspect of the invention, the aforementioned porous pad and the multi-layer anode screen may be approximately equal in thickness to their corresponding peripheral cell frames or, alternatively, the multi-layer anode screen may be thinner than its peripheral cell frame, with the porous pad being thicker than its peripheral cell frame. In the case of the latter alternative, the two straight separators used to axially contain the fluid cavities are replaced with two bent separators shaped to conform to the outer faces of the multi-layer screen and the porous pad, respectively. Preferably, the reduction in thickness to the multi-layer screen is approximately equal to the increase in thickness to the porous pad, and the two bent separators are identical in shape. Moreover, because the porous pad of the present invention obviates the need for a separate compression pad between adjacent cells (for pressure differentials up to about 400 psi), one of the two separators between adjacent cells may be omitted.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
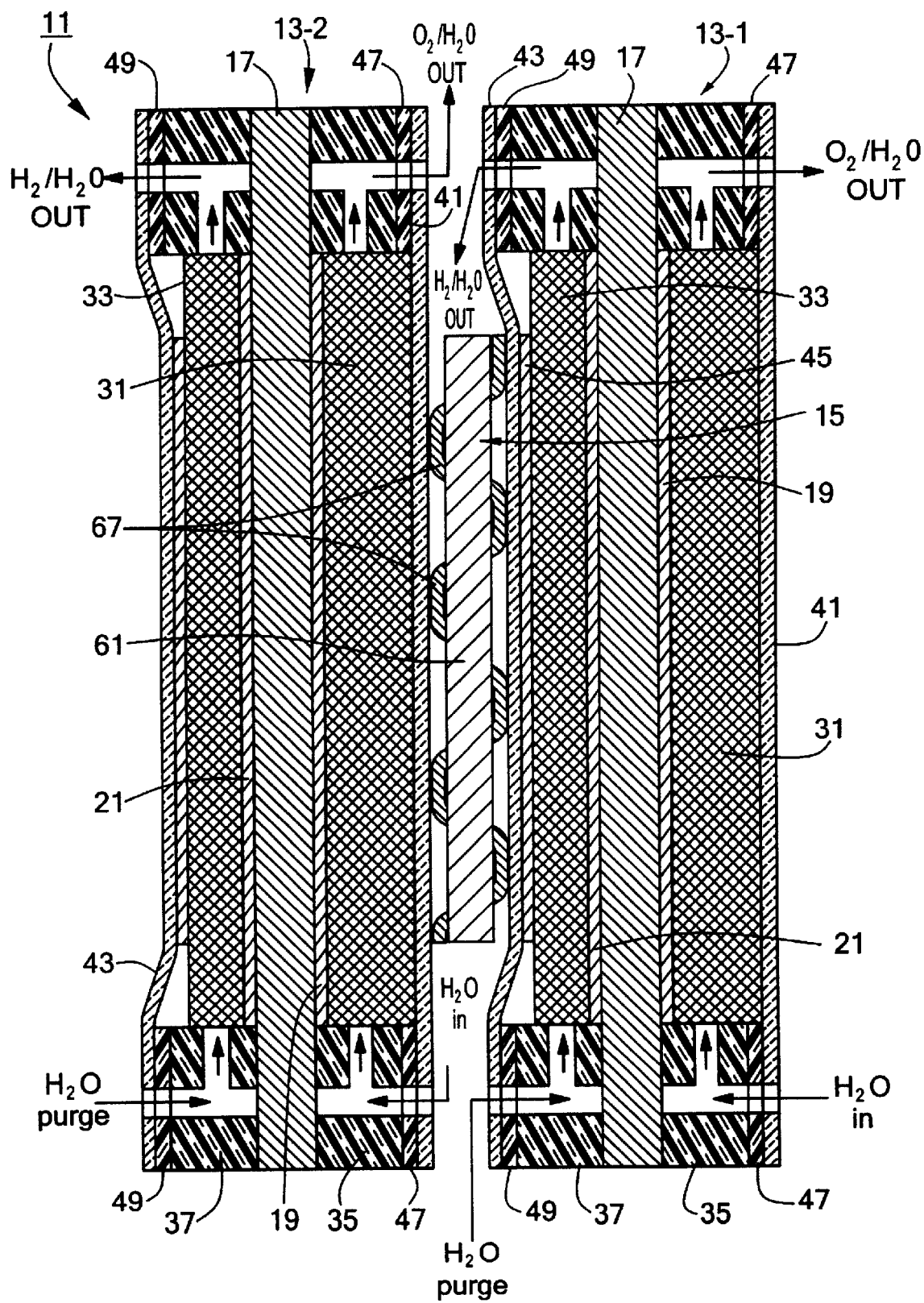
FIG. 1 is a schematic section view of a conventional PEM electrochemical cell stack.

Referring now to FIG. 1, there is shown a schematic section view of a conventional PEM electrochemical cell stack, said conventional PEM electrochemical cell stack being represented generally by reference numeral 11.

Stack 11 comprises a pair of PEM electrochemical cells 13-1 and 13-2 arranged in series in a bipolar configuration and a compression pad 15 interposed between cells 13-1 and 13-2 for electrically connecting cells 13-1 and 13-2 and for maintaining uniform contact over the active areas of cells 13-1 and 13-2. Although, for purposes of simplicity and clarity, stack 11 is shown in the present embodiment comprising only two cells 13-1 and 13-2 and a single compression pad 15, it can readily be appreciated that stack 11 may be modified to include as many as one hundred or more cells 13, with each adjacent pair of cells 13 being separated by an interposed compression pad 15.

Each cell 13 includes a proton exchange membrane 17, an anode 19 positioned along one face of proton exchange membrane 17, and a cathode 21 positioned along the other face of proton exchange membrane 17. A platinum film or other suitable catalyst (not shown) is positioned at the interface between anode 19 and proton exchange membrane 17, and a second platinum film or other suitable catalyst (not shown) is positioned at the interface between cathode 21 and proton exchange membrane 17.

Each cell 13 also comprises a pair of multi-layer metal screens 31 and 33. Screen 31 is placed in contact with the outer face of anode 19 and is used to define a fluid cavity through which water may pass and in which molecular oxygen generated at anode 19 may be collected. Screen 33 is placed in contact with the outer face of cathode 21 and is used to define a fluid cavity in which molecular hydrogen generated at cathode 21 may be collected.

Each cell 13 additionally comprises a pair of polysulfone cell frames 35 and 37, cell frame 35 peripherally surrounding screen 31 and cell frame 37 peripherally surrounding screen 33. Frames 35 and 37 are used to peripherally contain the fluids present within screens 31 and 33, respectively, and to conduct the fluids into and out of screens 31 and 33, respectively. Each of frames 35 and 37 typically has a thickness of about 0.060 inch.

Each cell 13 further comprises a pair of separators 41 and 43. Separators 41 and 43 are typically made of a metal foil, such as a titanium foil having a thickness of about 0.001 inch. Separator 41 is positioned against the outer face of screen 31. Separator 43 is positioned against the outer face of an electrically-conductive separator plate 45 which, in turn, is positioned against the outer face of screen 33. (Separator plate 45 prevents screen 33 from experiencing fretting corrosion caused by contact with separator 43.) Separators 41 and 43 serve to axially contain the fluids within screens 31 and 33, respectively. In addition, separators 41 and 43, separator plate 45, and screens 31 and 33 together serve to conduct electricity from anode 19 of cell 13-1 to cathode 21 of cell 13-2.

Each cell 13 also comprises a pair of plastic gaskets 47 and 49, gasket 47 sealing the outer face of frame 35 to separator 41 and gasket 49 sealing the outer face of frame 37 to separator 43. Each of gaskets 47 and 49 typically has a thickness of about 0.005 inch. The inner faces of frames 35 and 37 are sealed to proton exchange membrane 17.

Figure 2:
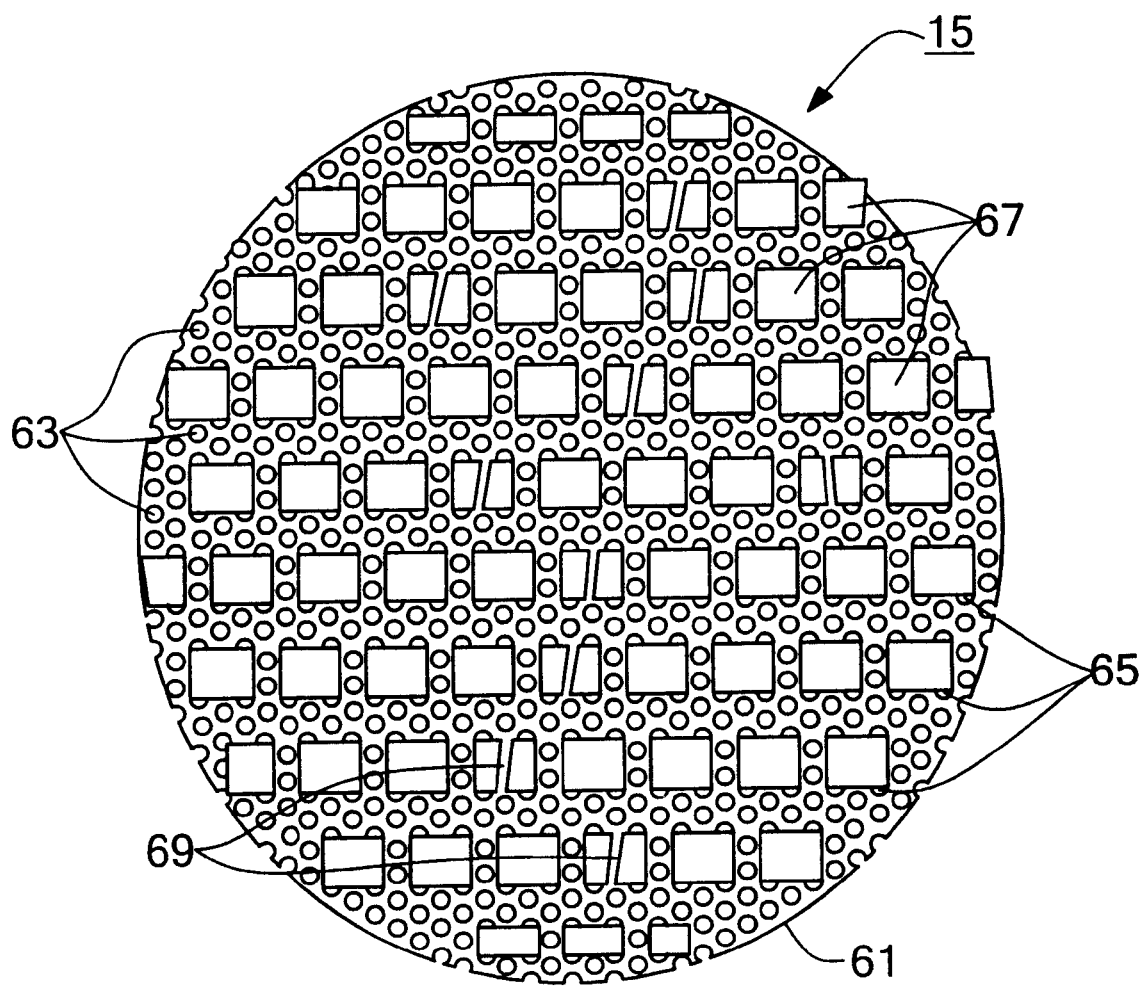
FIG. 2 is a front view of the compression pad shown in FIG. 1.

Referring now to FIG. 2, compression pad 15 is shown in greater detail and can be seen to include a spring-like disk 61. Disk 61 is typically made of a silicone rubber and has a thickness of about 0.065 inch. Disk 61 is provided with a patterned array of transverse holes 63 and transverse slots 65. Holes 63 allow for lateral expansion of disk 61 when disk 61 is compressed so that the overall surface area of disk 61 does not increase significantly during compression. Slots 65 are used to receive a plurality of metal strips 67. Strips 67, which typically have a thickness of about 0.005 inch, are woven in a parallel arrangement from one face of disk 61 to the opposite face of disk 61 through slots 65. Strips 67 are typically provided with transverse breaks 69 to allow for expansion.

Referring back to FIG. 1, pad 15 serves to evenly distribute pressure over the entireties of separators 41 and 43 (and, consequently, over the entire active areas of cells 13-1 and 13-2), provided that the differential pressure in the stack does not exceed about 500 psi. In addition, each strip 67 serves to electrically interconnect separators 41 and 43 at a plurality of points along the length of said strip 67. However, as explained above, the present inventors have noted that compression pad 15 adds weight and expense to stack 11 that, for many military and commercial applications, is undesirable.

Figure 3:
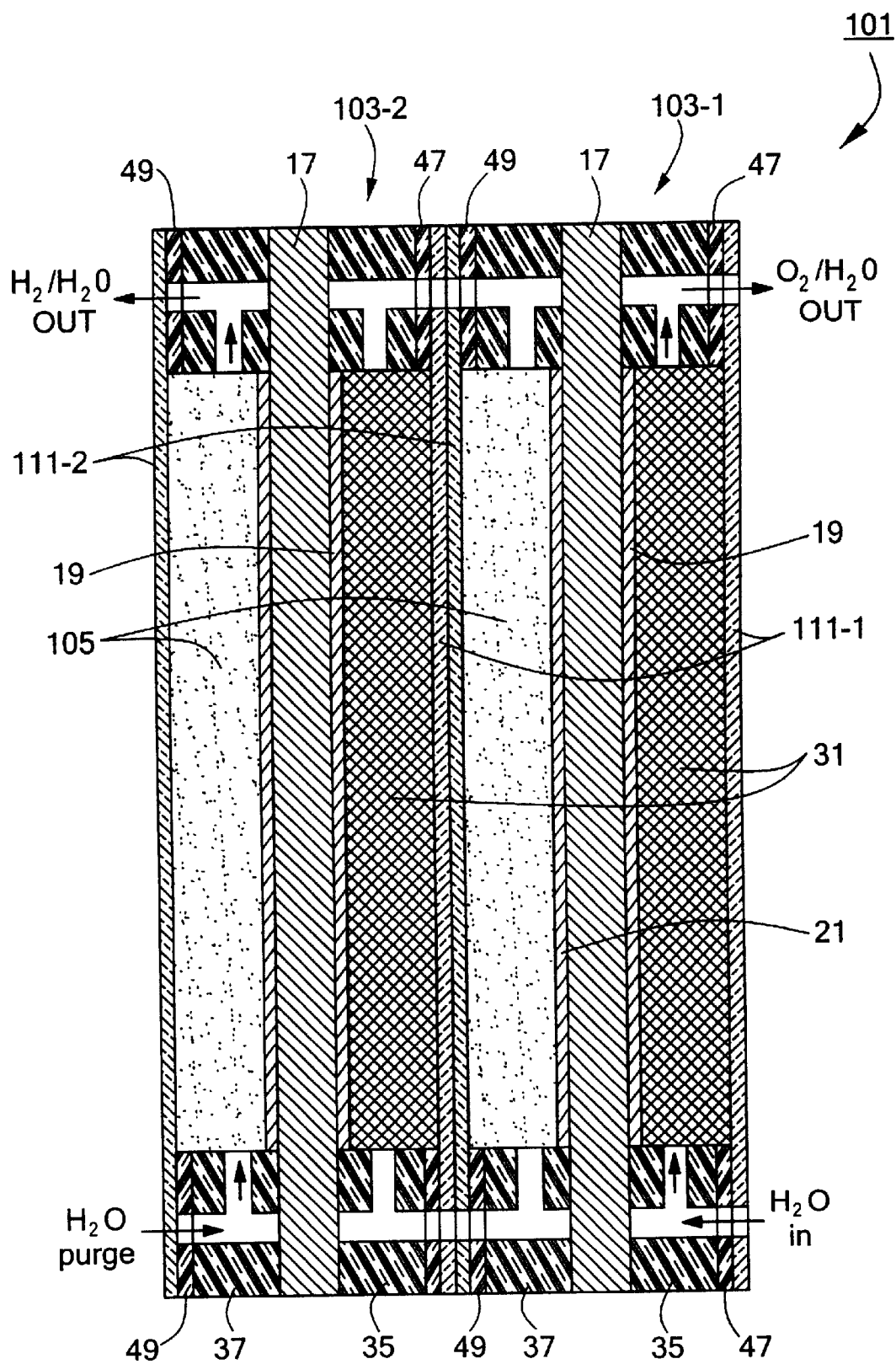
FIG. 3 is a schematic section view of a first embodiment of a PEM electrochemical cell stack constructed according to the teachings of the present invention.

Referring now to FIG. 3, there is shown a schematic section view of a first embodiment of a PEM electrochemical cell stack constructed according to the teachings of the present invention, said PEM electrochemical cell stack being represented generally by reference numeral 101.

Stack 101 is similar in certain respects to stack 11. For instance, stack 101 comprises a pair of cells 103-1 and 103-2 arranged in series in a bipolar configuration (it being understood that stack 101 may be modified to include up to one hundred or more cells 103 arranged in series in a bipolar configuration). Each cell 103 comprises a proton exchange membrane 17, an anode 19 positioned along one face of proton exchange membrane 17, and a cathode 21 positioned along the other face of proton exchange membrane 17. A first platinum film or other suitable catalyst (not shown) is positioned at the interface between anode 19 and proton exchange membrane 17, and a second platinum film or other suitable catalyst (not shown) is positioned at the interface between cathode 21 and proton exchange membrane 17. Each cell 103 also comprises a metal screen 31 placed in contact with the outer face of anode 19, a pair of polysulfone cell frames 35 and 37, and a pair of plastic gaskets 47 and 49.

Stack 101, however, differs notably from stack 11 in that stack 101 does not include screen 33, but rather, in its place comprises an electrically-conductive, compressible (i.e., spring-like), porous pad 105. In the present embodiment, pad 105 is a porous mat of randomly-arranged graphite fibers, said porous mat having a density of about 0.2–0.55 g/cm$^3$ and a relaxed or decompressed thickness of about 0.08 inch (Spectracarb Corporation, Lawrence, Mass.). It should be understood, however, that pad 105 may be made of materials other than carbon fibers, provided that the resulting product possesses sufficient porosity, electrical conductivity and compressibility.

Because pad 105 is compressible up to differential pressures of about 400 psi, one advantage of stack 101, as compared to stack 11, is that compression pad 15 may be omitted from stack 101, thereby resulting in a reduction in cost and weight to stack 101. In addition, because pad 105 is unlikely to experience fretting corrosion, separator plate 45 may also be omitted from stack 101, thereby resulting in a further reduction in cost and weight to stack 101. Moreover, pad 105, itself, is typically lighter and cheaper than multi-layer metal screen 31, which is typically made of zirconium and which requires the welding together of its component layers. (In addition, platinum plating is also often applied to screen 31 to minimize contact resistance.) Furthermore, unlike metal screen 31, pad 105 is unlikely to become embrittled due to prolonged exposure to hydrogen gas. Lastly, pad 105 may be impregnated with polymeric or elastomeric materials, such as Teflon, Kynar, fluoroelastomers, ionomers (e.g., Nafion), to enhance its structural integrity and spring rate, without sacrificing other essential properties, such as high conductivity and porosity.

Stack 101 further differs from stack 11 in that stack 101 includes a pair of straight metal foil separators 111-1 and 111-2, instead of a straight separator 41 and a bent separator 43, separator 43 being bent to accommodate compression pad 15.

Figure 4:
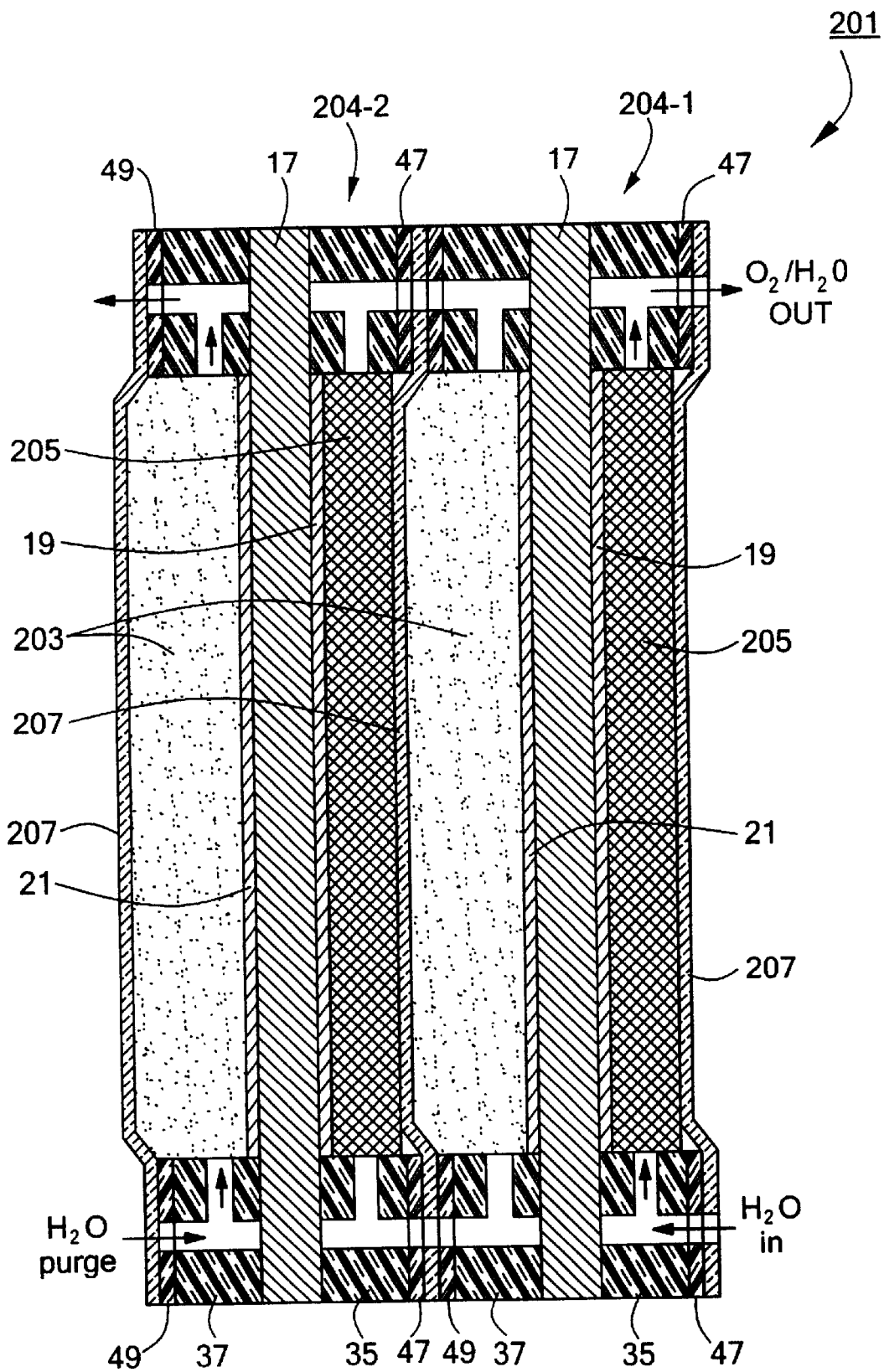
FIG. 4 is a schematic section view of a second embodiment of a PEM electrochemical cell stack constructed according to the teachings of the present invention.

Referring now to FIG. 4, there is shown a schematic section view of a second embodiment of a PEM electrochemical cell stack constructed according to the teachings of the present invention, said PEM electrochemical cell stack being represented generally by reference numeral 201.

Stack 201 is similar in many respects to stack 101, the principal differences between the two stacks being that (i) pad 105 of stack 101 is replaced with a pad 203 in stack 201, pad 203 being identical to pad 105, except that pad 203 has an increased relaxed or decompressed thickness of about 0.11 inch (and a compressed thickness of about 0.095 inch); (ii) screen 31 of stack 101 is replaced with a screen 205 in stack 201, screen 205 being similar to screen 31 but having fewer layers and having a reduced thickness of about 0.035 inch (as compared to a thickness of about 0.060 inch for screen 31); and (iii) separators 111-1 and 111-2 of stack 101 are with replaced with a single separator 207, separator 207 being positioned between a pair of adjacent cells 204-1 and 204-2 and having a bent shape (i.e., hat-shaped) to conform to the outer face of screen 205 for cell 204-2 and the outer face of pad 203 (as well as a portion of the top and bottom of pad 203) for cell 204-1.

The following examples are provided for illustrative purposes only and are in no way intended to limit the scope of the present invention:

EXAMPLE 1

Figure 5:
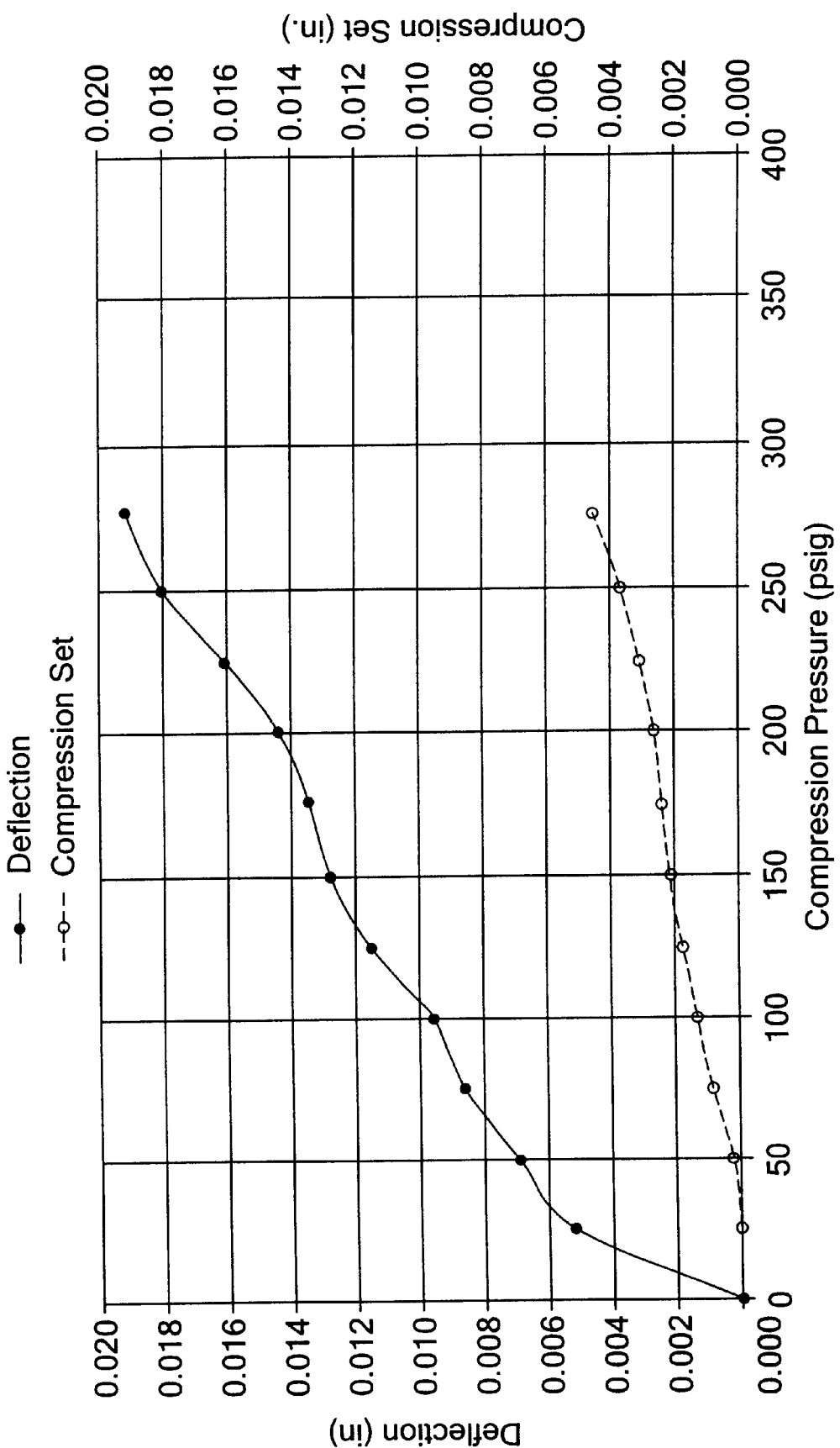
FIG. 5 is a graphic depiction of the spring rate and compression set, as a function of compression pressure, of an individual PEM electrochemical cell of the stack of FIG. 3, said individual PEM electrochemical cell comprising a 0.44 $g/cm^3$ porous graphite pad having a diameter of 5.6 inches and a nominal thickness of 0.085 inch.
Figure 6:
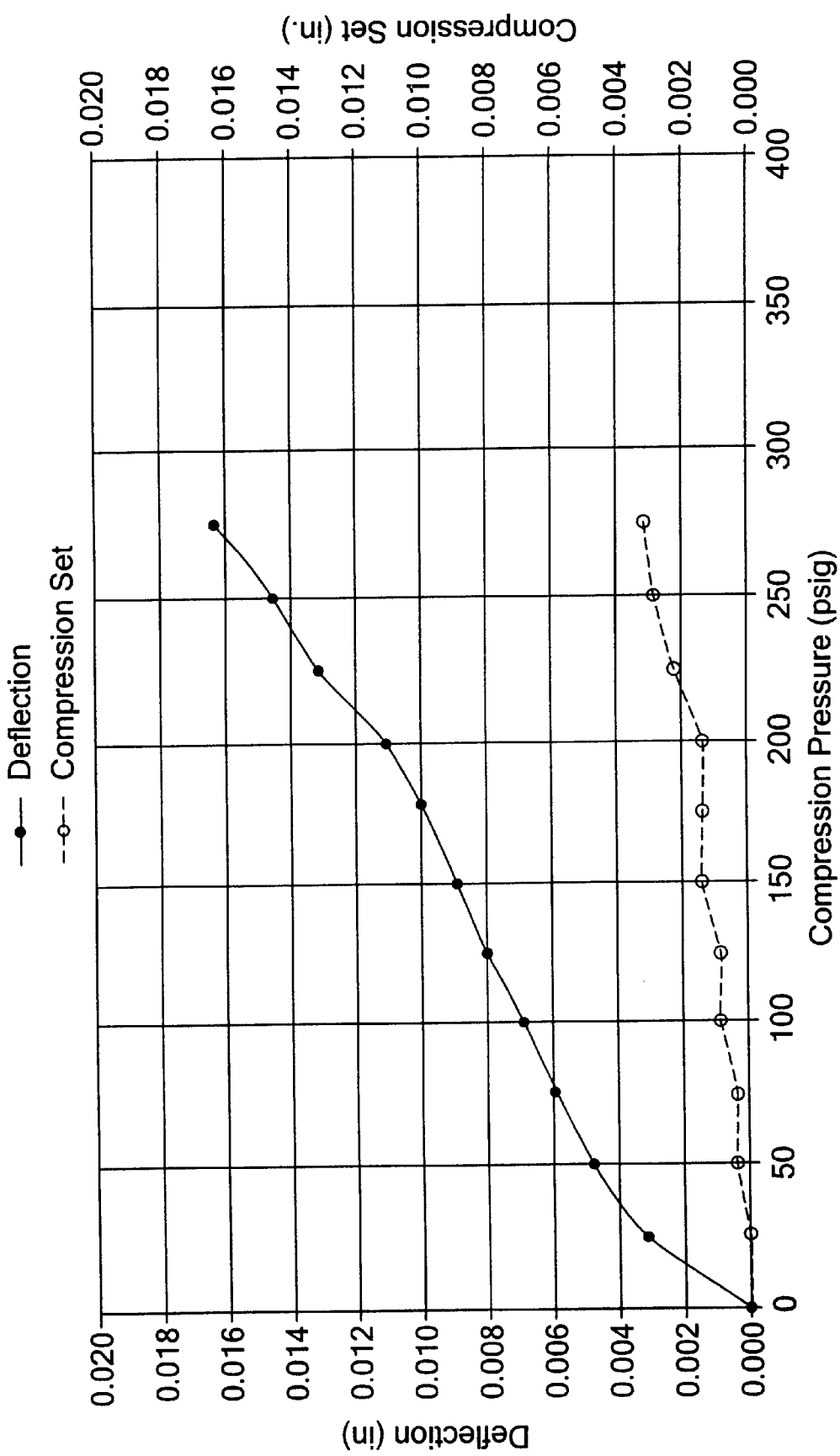
FIG. 6 is a graphic depiction of the spring rate and compression, set, as a function of compression pressure, of an individual PEM electrochemical cell of the stack of FIG. 3, said individual PEM electrochemical cell comprising a 0.48 $g/cm^3$ porous graphite pad having a diameter of 5.6 inches and a nominal thickness of 0.084.
Figure 7:
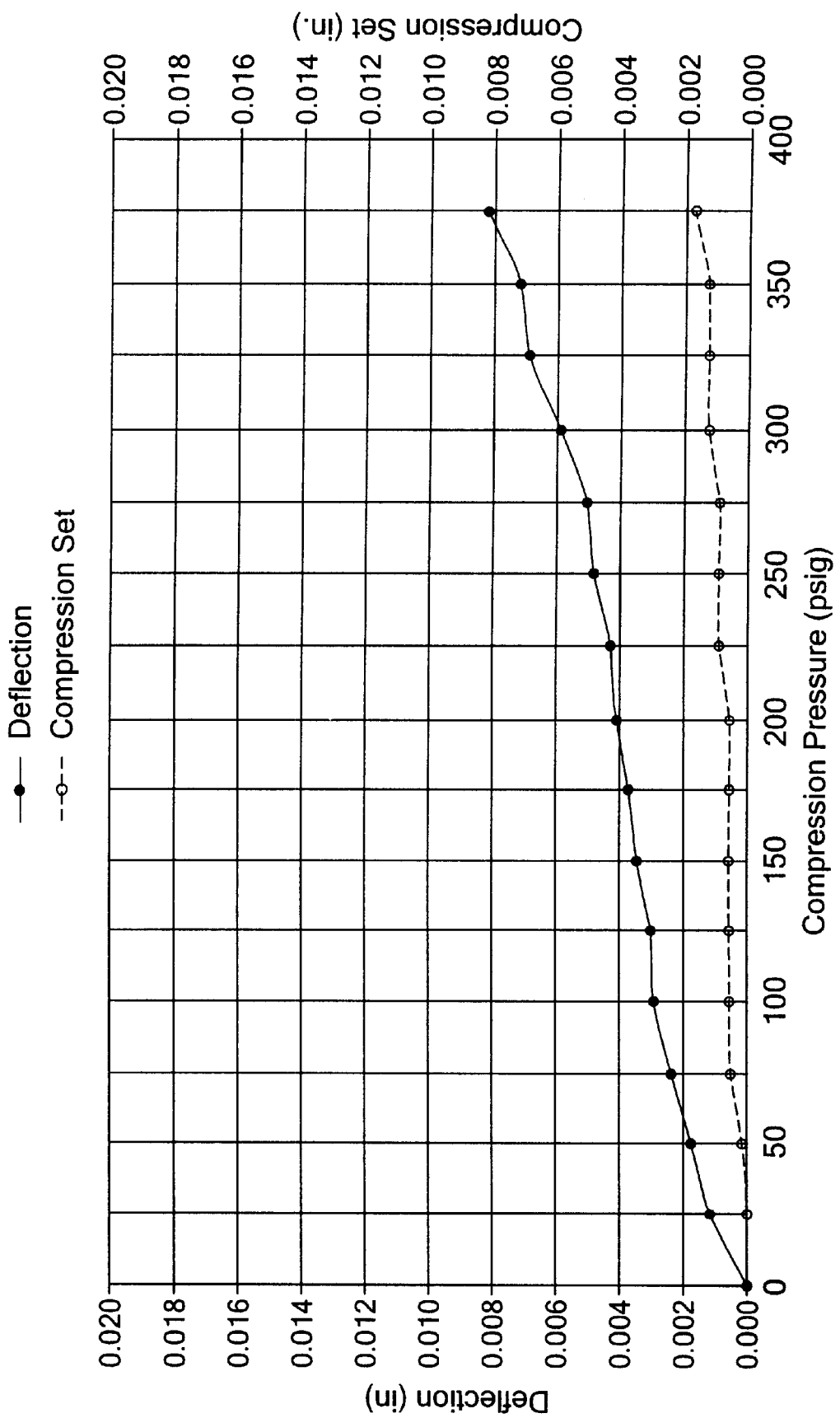
FIG. 7 is a graphic depiction of the spring rate and compression set, as a function of compression pressure, of an individual PEM electrochemical cell of the stack of FIG. 3, said individual PEM electrochemical cell comprising a 0.55 $g/cm^3$ porous graphite pad having a diameter of 5.6 inches and a nominal thickness of 0.079 inch.

Three different compression pads 105 having respective densities of 0.44 g/cm$^3$, 0.48 g/cm$^3$ and 0.55 g/cm$^3$, respective thicknesses of 0.085 inch, 0.084 inch and 0.079 inch, and each having a diameter of 5.6 inches were tested for both spring rate and compression set by incorporation into three corresponding individual cells 103. The results of said testing are graphically depicted in FIGS. 5 through 7, respectively. As can be seen, the most desirable pad 105 of the three tested was the pad having a density of 0.55 g/cm$^3$ since it resulted in the most modest range of deflection in the pressure range of interest (200 to 500 psi), with negligible compression set or structural degradation.

EXAMPLE 2

Figure 8:
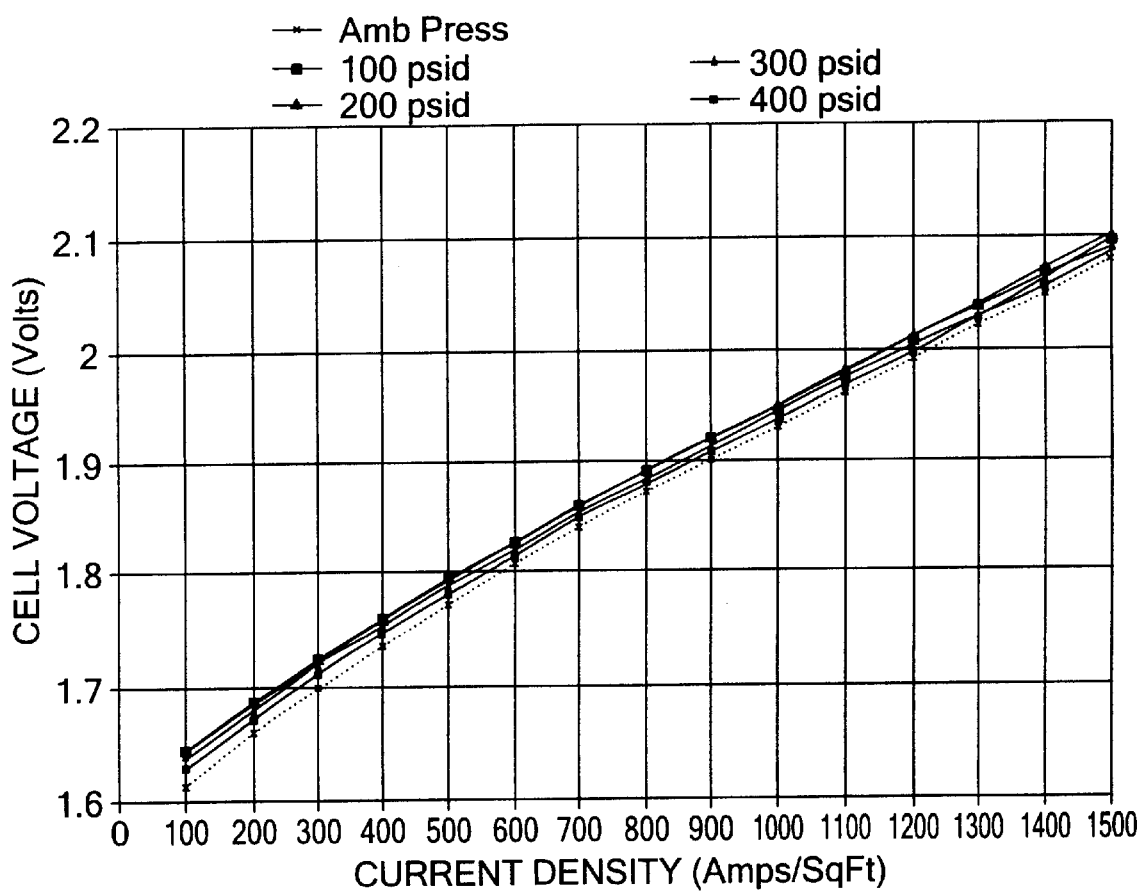
FIG. 8 is a graphic depiction of the electrolyzing performance, as a function of differential pressure, of an individual PEM electrochemical cell comprising a 0.55 $g/cm^3$ porous graphite pad having a thickness of 0.08 inch and a diameter of 1.25 inch.

The electrolyzing performance of a cell 103 comprising a pad 105 having a density of 0.55 g/cm$^3$ and a diameter of 1.25 inch was tested as a function of the differential between the hydrogen pressure and the oxygen pressure (oxygen being generated at ambient pressure). The results are shown in FIG. 8. As can be seen, there was essentially no change in performance for differential pressures up to 400 psi, indicating good spring rate and no compression set. It is believed that Teflon impregnation of the pad would further enhance structural integrity and spring rate, without sacrificing other essential properties.

EXAMPLE 3

Figure 9:
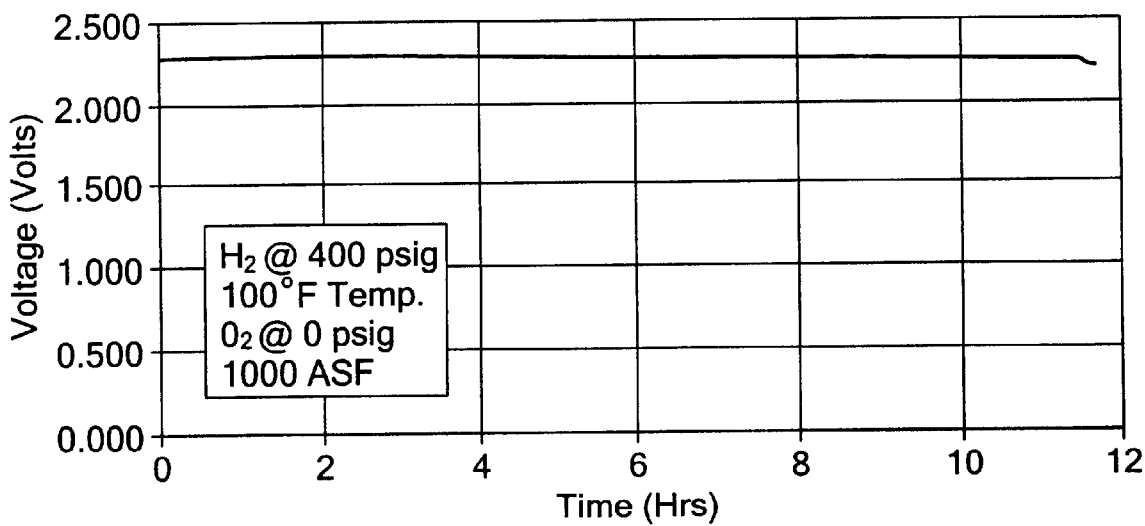
FIG. 9 is a graphic depiction of the electrolyzing performance, as a function of time, of an individual PEM electrochemical cell comprising a 0.44 $g/cm^3$ porous graphite pad having a thickness of 0.08 inch and a diameter of 1.25 inch, said cell being operated at a differential pressure of 400 psi.

The electrolyzing stability of a cell 103 comprising a pad 105 having a density of 0.44 g/cm$^3$ and a diameter of 1.25 inch was tested over a 12 hour period at a differential pressure of 400 psi. The results are shown in FIG. 9. As can be seen, the cell 103 remained very stable over the entire period in question.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An electrochemical cell comprising:
   (a) a proton exchange membrane, said proton exchange membrane having a first face and a second face;
   (b) an anode, said anode having an inner face and an outer face, said inner face of said anode being positioned along said first face of said proton exchange membrane and being electrically coupled thereto;
   (c) a cathode, said cathode having an inner face and an outer face, said inner face of said cathode being positioned along said second face of said proton exchange membrane and being electrically coupled thereto;
   (d) a metal screen for defining a first fluid cavity, said metal screen having an inner face and an outer face, said inner face of said metal screen being placed in contact with said outer face of said anode;
   (e) a compression pad for defining a second fluid cavity, said compression pad being electrically-conductive, compressible and porous and having an inner face and an outer face, said inner face being placed in contact with said outer face of said cathode;
   (f) means for axially containing fluid present within said metal screen and said compression pad; and
   (g) means for peripherally containing fluid present within said metal screen and said compression pad.

2. The electrochemical cell as claimed in claim 1 wherein said compression pad comprises a mat of carbon fibers.

3. The electrochemical cell as claimed in claim 2 wherein said mat has a density of about 0.2–0.55 g/cm$^3$.

4. The electrochemical cell as claimed in claim 3 wherein said mat has a density of about 0.44–0.55 g/cm$^3$.

5. The electrochemical cell as claimed in claim 3 wherein said mat has a density of about 0.55 g/cm$^3$.

6. The electrochemical cell as claimed in claim 5 wherein said mat has an uncompressed thickness of about 0.08 inch.

7. The electrochemical cell as claimed in claim 5 wherein said mat has an uncompressed thickness of about 0.11 inch.

8. The electrochemical cell as claimed in claim 3 wherein said mat has an uncompressed thickness of about 0.08 inch.

9. The electrochemical cell as claimed in claim 3 wherein said mat has an uncompressed thickness of about 0.11 inch.

10. The electrochemical cell as claimed in claim 1 wherein said axially containing means comprises a first separator placed in contact with said outer face of said metal screen and a second separator placed in contact with said outer face of said compression pad.

11. The electrochemical cell as claimed in claim 10 wherein each of said separators is electrically-conductive.

12. The electrochemical cell as claimed in claim 11 wherein each of said separators is straight and wherein said peripherally containing means comprises a pair of cell frames, one of said cell frames being approximately equal in thickness to and peripherally surrounding said metal screen, the other of said cell frames being approximately equal in thickness to and peripherally surrounding said compression pad.

13. An electrochemical cell stack comprising two electrochemical cells as claimed in claim 12, said two electrochemical cells being arranged in series in a bipolar configuration, with said first separator of one of said two electrochemical cells being in contact with said second separator of the other of said two electrochemical cells.

14. The electrochemical cell stack as claimed in claim 13 wherein each of said compression pads comprises a mat of carbon fibers, said mat having a density of about 0.2–0.55 g/cm$^3$.

15. The electrochemical cell stack as claimed in claim 1 wherein said compression pad comprises a mat of carbon fibers impregnated with polymeric or elastomeric materials to enhance its structural integrity and spring rate, without sacrificing conductivity and porosity.

16. An electrochemical cell comprising:
   (a) first and second separators, said first and second separators being electrically conductive, being spaced apart from one another and being generally parallel to one another;
   (b) a proton exchange membrane disposed between said first and second separators;
   (c) an anode, said anode being positioned between said proton exchange membrane and said first separator and being electrically coupled to said proton exchange membrane;
   (d) a cathode, said cathode being positioned between said proton exchange membrane and said second separator and being electrically coupled to said proton exchange membrane;
   (e) a metal screen, said metal screen being positioned between said anode and said first separator and being electrically coupled to each of said anode and said first separator; and
   (f) an electrically-conductive, compressible, porous pad, said electrically-coupled, compressible, porous pad being positioned between said cathode and said second separator and being electrically coupled to each of said cathode and said second separator; and
   (g) a pair of cell frames, one of said cell frames being in peripheral contact with said metal screen, the other of said cell frames being in peripheral contact with said electrically-conductive, compressible, porous pad.

17. The electrochemical cell as claimed in claim 16 wherein said electrically-conductive, compressible, porous pad comprises a mat of carbon fibers.

18. The electrochemical cell as claimed in claim 17 wherein said mat has a density of about 0.2–0.55 g/cm$^3$.

19. The electrochemical cell as claimed in claim 18 wherein said first and second separators are straight in cross-section and serve to axially contain fluid present within said metal screen and said electrically-conductive, compressible, porous pad, respectively, wherein said first cell frame has a thickness approximately equal to the thickness of said metal screen so that said first cell frame serves to peripherally contain fluid within said metal screen, and wherein said second cell frame has a thickness approximately equal to the thickness of said electrically-conductive, compressible, porous pad so that said second cell frame serves to peripherally contain fluid within said electrically-conductive, compressible, porous pad.

20. The electrochemical cell as claimed in claim 18 wherein said first cell frame has an outer face and a thickness greater than that of said metal screen, wherein said second cell frame has an outer face and a thickness less than that of said electrically-conductive, compressible, porous pad, wherein said first separator is bent so that its periphery is coupled to the outer face of said first cell frame and its midsection is in contact with the outer face of said metal screen, and wherein said second separator is bent so that its periphery is coupled to the outer face of said second cell frame and its midsection is in contact with the outer face of said electrically-conductive, compressible, porous pad.

21. The electrochemical cell stack as claimed in claim 16 wherein said electrically-conductive, compressible, porous pad comprises a mat of carbon fibers impregnated with polymeric or elastomeric materials to enhance its structural integrity and spring rate, without sacrificing conductivity and porosity.

22. An electrochemical cell stack comprising:
   (a) a first proton exchange membrane, said first proton exchange membrane having a first face and a second face;
   (b) a first anode, said first anode having an inner face and an outer face, said inner face of said first anode being positioned along said first face of said first proton exchange membrane and being electrically coupled thereto;
   (c) a first cathode, said first cathode having an inner face and an outer face, said inner face of said first cathode being positioned along said second face of said first proton exchange membrane and being electrically coupled thereto;
   (d) a first metal screen, said first metal screen having an inner face and an outer face, said inner face of said first metal screen being placed in contact with said outer face of said first anode;
   (e) a first compression pad, said first compression pad being electrically-conductive, compressible and porous and having an inner face and an outer face, said inner face of said first compression pad being placed in contact with said outer face of said cathode;
   (f) a first cell frame, said first cell frame being in peripheral contact with said first metal screen, said first cell frame having a thickness greater than that of said first metal screen;
   (g) a second cell frame, said second cell frame being in peripheral contact with said first compression pad, said second cell frame having a thickness less than that of said first compression pad;
   (h) first and second separators, each of said first and second separators being electrically conductive wherein said first separator is bent so that its periphery is coupled to the outer face of said first cell frame and its midsection is in contact with the outer face of said metal screen, and wherein said second separator is bent so that its periphery is coupled to the outer face of said second cell frame and its midsection is in contact with the outer face of said electrically-conductive, compressible, porous pad;
   (i) a second proton exchange membrane, said second proton exchange membrane having a first face and a second face;
   (j) a second anode, said second anode having an inner face and an outer face, said inner face of said second anode being positioned along said first face of said second proton exchange membrane and being electrically coupled thereto;
   (k) a second cathode, said second cathode having an inner face and an outer face, said inner face of said second cathode being positioned along said second face of said second proton exchange membrane and being electrically coupled thereto;
   (l) a second metal screen, said second metal screen having an inner face and an outer face, said inner face of said second metal screen being placed in contact with said outer face of said second anode, said outer face of said second metal screen being placed in contact with the midsection of said second separator;
   (m) a second compression pad, said second compression pad being electrically-conductive, compressible and porous and having an inner face and an outer face, said inner face of said second compression pad being placed in contact with said outer face of said second cathode;

(n) a third cell frame, said third cell frame being in peripheral contact with said second metal screen, said third cell frame having a thickness greater than that of said second metal screen;

(o) a fourth cell frame, said fourth cell frame being in peripheral contact with said second compression pad, said fourth cell frame having a thickness less than that of said second compression pad; and (p) a third separator, said third separator being electrically conductive and being bent so that its periphery is coupled to the outer face of said fourth cell frame and its midsection is in contact with the outer face of said second compression pad.

23. The electrochemical cell stack as claimed in claim 22 wherein each of said first and second compression pads comprises a mat of carbon fibers.

24. The electrochemical cell stack as claimed in claim 23 wherein said mat has a density of about 0.2–0.55 g/cm$^3$.

25. The electrochemical cell stack as claimed in claim 24 wherein each of said first and second compression pads has an uncompressed thickness of about 0.11 inch, wherein each of said first and second metal screens has a thickness of about 0.035 inch and wherein each of said first, second, third and fourth cell frames has a thickness of about 0.06 inch.

26. The electrochemical cell as claimed in claim 22 wherein each of said first and second compression pads comprises a mat of carbon fibers impregnated with polymeric or elastomeric materials to enhance its structural integrity and spring rate, without sacrificing conductivity and porosity.

* * * * *